United States Patent
Kataumi et al.

[11] Patent Number: 5,445,046
[45] Date of Patent: Aug. 29, 1995

[54] DETENT MECHANISM FOR AUTOMATIC TRANSMISSION SHIFT CONTROL DEVICE

[75] Inventors: Yoshimasa Kataumi; Yasuyuki Ikegami, both of Kosai, Japan

[73] Assignee: Fuji Kiko Co., Ltd., Tokyo, Japan

[21] Appl. No.: 187,994

[22] Filed: Jan. 28, 1994

[30] Foreign Application Priority Data

Jan. 29, 1993 [JP] Japan .................. 5-002074 U
Jul. 29, 1993 [JP] Japan .................. 5-041581 U

[51] Int. Cl.⁶ .................. F16H 63/38; F16H 59/04
[52] U.S. Cl. .................. 74/527; 74/475
[58] Field of Search .................. 74/528, 527, 523, 543

[56] References Cited

U.S. PATENT DOCUMENTS

| | | | |
|---|---|---|---|
| 4,232,564 | 11/1980 | Yamasaki | 74/527 X |
| 4,365,522 | 12/1982 | Kubota et al. | 74/527 X |
| 4,393,729 | 7/1983 | Wilson | 74/527 X |
| 4,699,018 | 10/1987 | Tagawa | 74/527 X |
| 5,016,738 | 5/1991 | Shirahama et al. | |
| 5,263,383 | 11/1993 | Meisch et al. | 74/527 X |
| 5,277,078 | 1/1994 | Osborn et al. | 74/527 X |
| 5,309,783 | 5/1994 | Doolittle et al. | 74/523 X |

*Primary Examiner*—Charles A. Marmor
*Assistant Examiner*—Mary Ann Battista
*Attorney, Agent, or Firm*—Lowe, Price, LeBlanc & Becker

[57] ABSTRACT

A detent mechanism includes a single piece pivotal connecting unit on which a shift lever, a detent arm and a spring for urging a detent arm in a predetermined direction are installed to constitute a subassembly prior to installation on a base.

14 Claims, 8 Drawing Sheets

DETENT MECHANISM FOR AUTOMATIC TRANSMISSION SHIFT CONTROL DEVICE

BACKGROUND OF THE INVENTION

1. Field of the Invention

The present invention relates in general to an automatic transmission shift control device and more particularly to a detent mechanism for an automatic transmission shift control device.

2. Description of the Prior Art

A detent mechanism is used in an automatic transmission shift control device so that a shift lever can have a sharp operation feel or a click feel, i.e., a feel that the shift lever clicks when shifted into the gear positions.

The prior art detent mechanism has a disadvantage that it needs a complex and difficult assembly work, i.e., it cannot be assembled with ease and efficiency.

SUMMARY OF THE INVENTION

According to an aspect of the present invention, there is provided a detent mechanism for an automatic transmission shift control device, which comprises a stationary base having a plurality of detent teeth, a single piece pivotal connecting unit pivotally connecting a shift lever to the base and having an upstanding tubular portion and a base portion at the side of the tubular portion, a spring installed in the tubular portion and having an upper end portion protruding from same, and a detent arm pivotally installed at an end on the base portion and engaged at the other end with the protruding end portion of the spring, the detent arm having at the other end a projection releasably engaged with one of the detent teeth.

According to a further aspect of the present invention, there is provided a detent mechanism for an automatic transmission shift control device, which comprises a stationary base having a plurality of detent teeth, a single piece pivotal connecting unit having a horizontal shaft portion at which it is pivotally installed on the base, first and second upstanding parallel tubular portions connected at lower ends thereof to the shaft portion, and a base portion at the side of the tubular portions, the first tubular portion installing therein a shift lever, a spring installed in the second tubular portion and having an upper end portion protruding from same, and a detent arm pivotally installed at a first longitudinal end on the base portion and engaged at a second longitudinal end with the protruding end portion of the spring, the detent arm having at the second longitudinal end a projection releasably engaged with one of the detent teeth.

The above structure is effective for solving the above noted problem inherent in the prior art device.

It is accordingly an object of the present invention to provide a detent mechanism for an automatic transmission shift control device which can be assembled with ease and efficiency.

It is a further object of the present invention to provide a detent mechanism of the above described character which is simple in structure but can effect an assured operation.

It is a yet further object of the present invention to provide a detent mechanism of the above described character which needs only a small number of constituent parts.

DETAILED DESCRIPTION OF THE PREFERRED EMBODIMENTS

Referring to FIGS. 1 to 7 inclusive, a detent mechanism according to an embodiment of the present invention includes a base 10 fixedly attached to a vehicle body (not shown) and formed with a series of detent teeth 12, and a pivotal connecting unit 14 pivotally installed on the base 10. The connecting unit 14 is a single piece made of a synthetic resinous material and includes a horizontal shaft portion 16, first and second parallel upstanding tubular portions 18 and 20 connected at the lower ends thereof to the shaft portion 16 and installing therein a shift lever 22 and a spring 24, respectively, and a base portion 26 arranged at the side of the first and second tubular portions 18 and 20 and having a bearing section 26a pivotally supporting therein a detent arm 28. The detent arm 28 has at the other end thereof a projection 30 for engagement in the detent teeth 12.

More specifically, the base portion 26 is in the form of a flat triangular framework including one side extending along the first tubular portion 18 and is located in a vertical plane along which said connecting unit 14 swings. The base portion 26 is formed with an opening 26a for connecting thereto a cable (not shown) for automatic transmission shift control and a part-cylindrical bearing section 26b for supporting therein an end of the detent arm 28. The shaft portion 16 about which the connecting unit 14 is to swing, has at the opposite axial ends thereof a pair of part-cylindrical pivot sections 16a having a oblong cross section consisting of two parallel straight sides and two part-circular sides. The base 10 has a pair of part-cylindrical bearing portions 32 having openings 34 through which the pivot sections 16a of the shaft portion 16 are inserted into the bearing portions 32 by aligning the part-circular sides of the pivot sections 16a with the openings 34. The pivot sections 14a are rotatably held in the bearing portions 32 by misaligning the part-circular sides of the pivot sections 16a with the openings 34.

The detent arm 28 is made of a synthetic resinous material and has at an end opposite to the end formed with the projection 30, a part-cylindrical pivot section 36 protruding laterally therefrom and formed with an opening 38. The pivot section 36 has an oblong cross section consisting of two parallel straight sides and two part-circular sides. The pivot section 36 is inserted through the opening 38 into the bearing section 26b as indicated by the arrow in FIG. 3 by aligning the part-circular sides of the pivot section 36 with the opening 38 and then rotated a quarter of one revolution into the position as indicated by the two-dot chain lines to misalign the circular sides of the pivot section 36 with the opening 38 such that the pivot section 36 is rotatably held in the bearing section 26b whilst being prevented from slipping off from the same.

The shift lever 22, which is hollow cylindrical, is formed with a pair of diametrically opposed openings (not shown) which are elongated axially thereof. A position pin (not shown) is movably installed in the openings to extend crosswise of the shift lever 22 and urged upwardly by a spring (not shown) for engagement with a detent face 40 which defines the gear positions of the shift lever 22. The detent face 40 is formed in a position plate 42 provided to the base 10. The above described diametrically opposed openings formed in the shift lever 22 and the position pin movably installed therein are constructed and arranged substantially the same as disclosed in U.S. Pat. No. 5,016,738.

Figure 1:
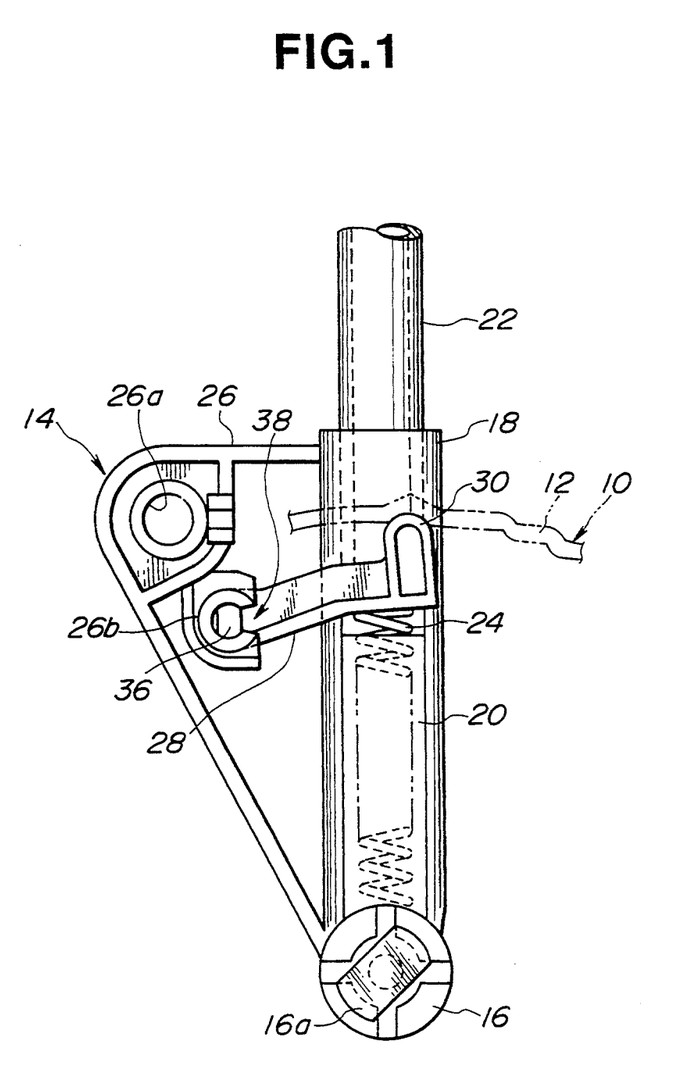
FIG. 1 is an elevational view of a subassembly constituting a novel important portion of a detent mechanism for an automatic transmission shift control device according to an embodiment of the present invention.
Figure 2:
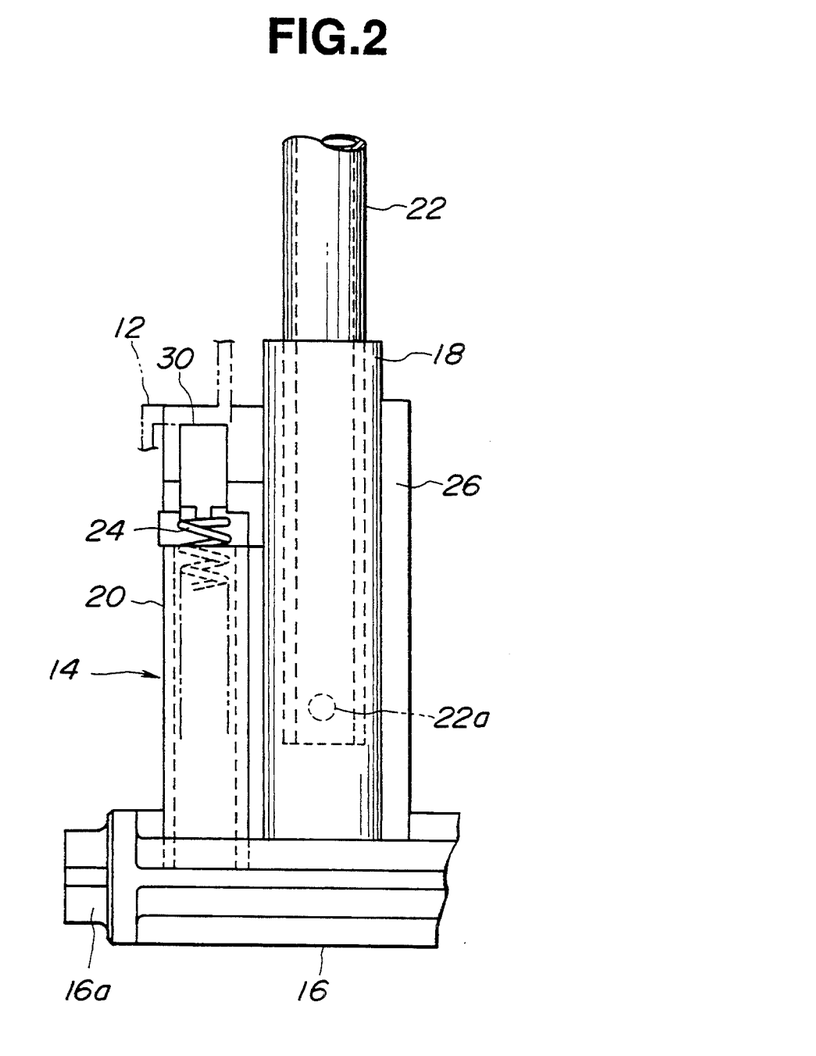
FIG. 2 is a side elevational view taken from the direction "II" of FIG. 1.
Figure 3:
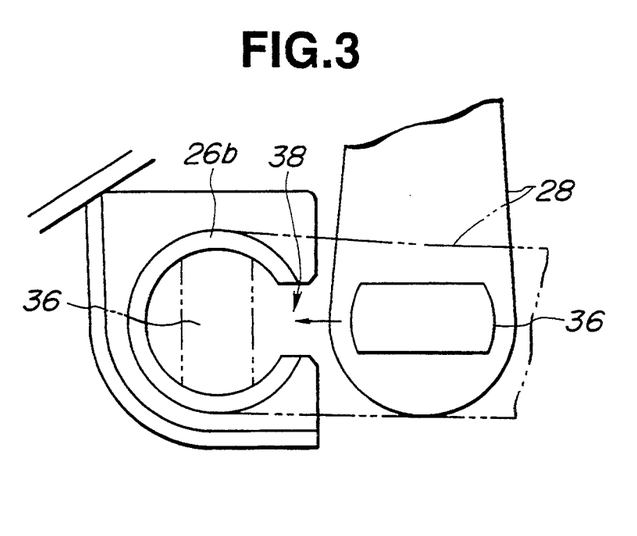
FIG. 3 is an enlarged fragmentary exploded view of the subassembly of FIG. 1 for illustrating how to assemble the constituent parts thereof.

Indicated by 22a in FIG. 2 is an opening formed in the shift lever 22 for engagement with an internal projection of the first tubular portion 18 for thereby being fixedly attached thereto.

Figure 5:
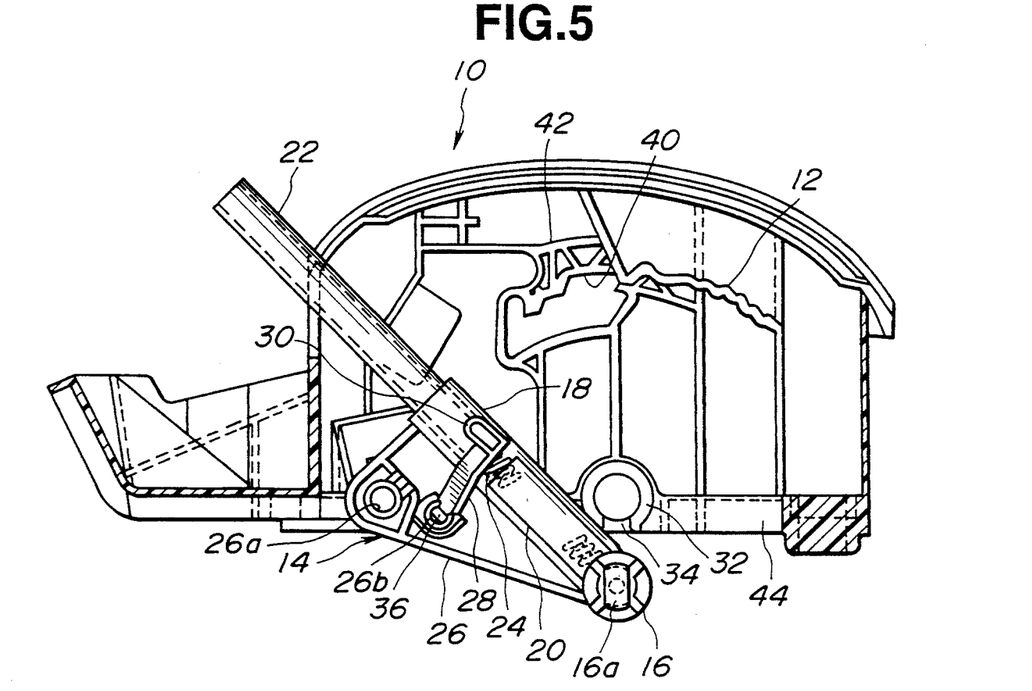
FIG. 5 is an elevational view of the subassembly of FIG. 1 and a base of the detent mechanism prior to assembling thereof.
Figure 6:
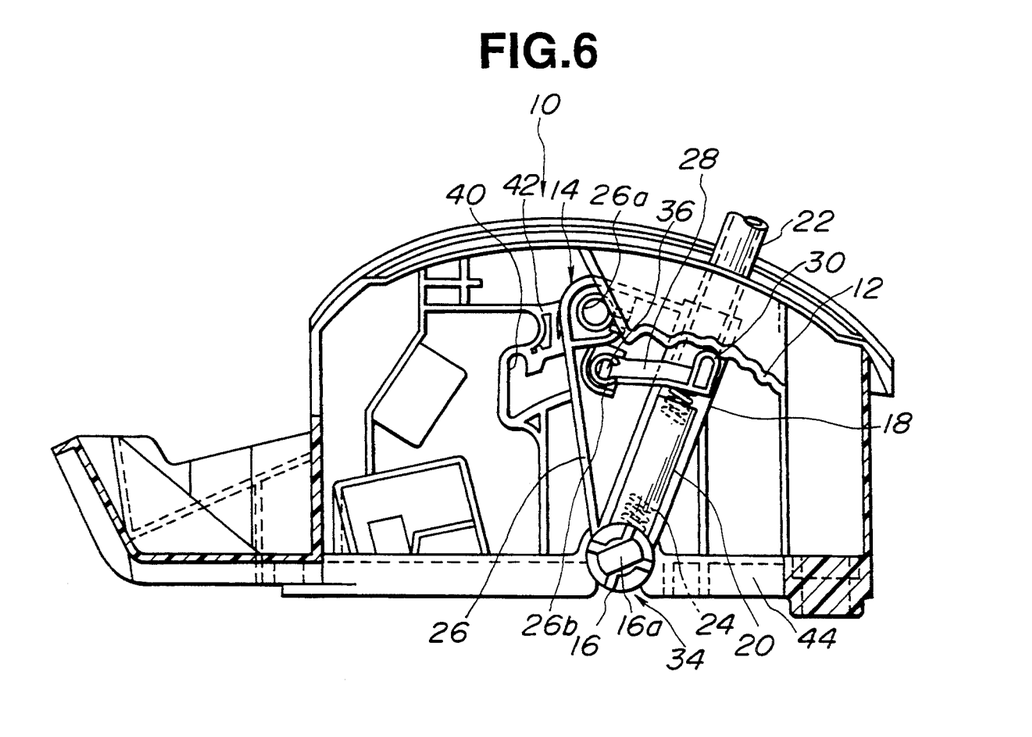
FIG. 6 is a view similar to FIG. 5 but shows the detent mechanism in an assembled state.

The base 10, as shown in FIGS. 5 and 6, is a single piece made of a synthetic resinous material and has an opening 44 the width of which is nearly equal to the length of the shaft portion 16, the bearing portions 32, the detent teeth 12 and the detent face 40 for sliding contact with the position pin (not shown).

Figure 7:
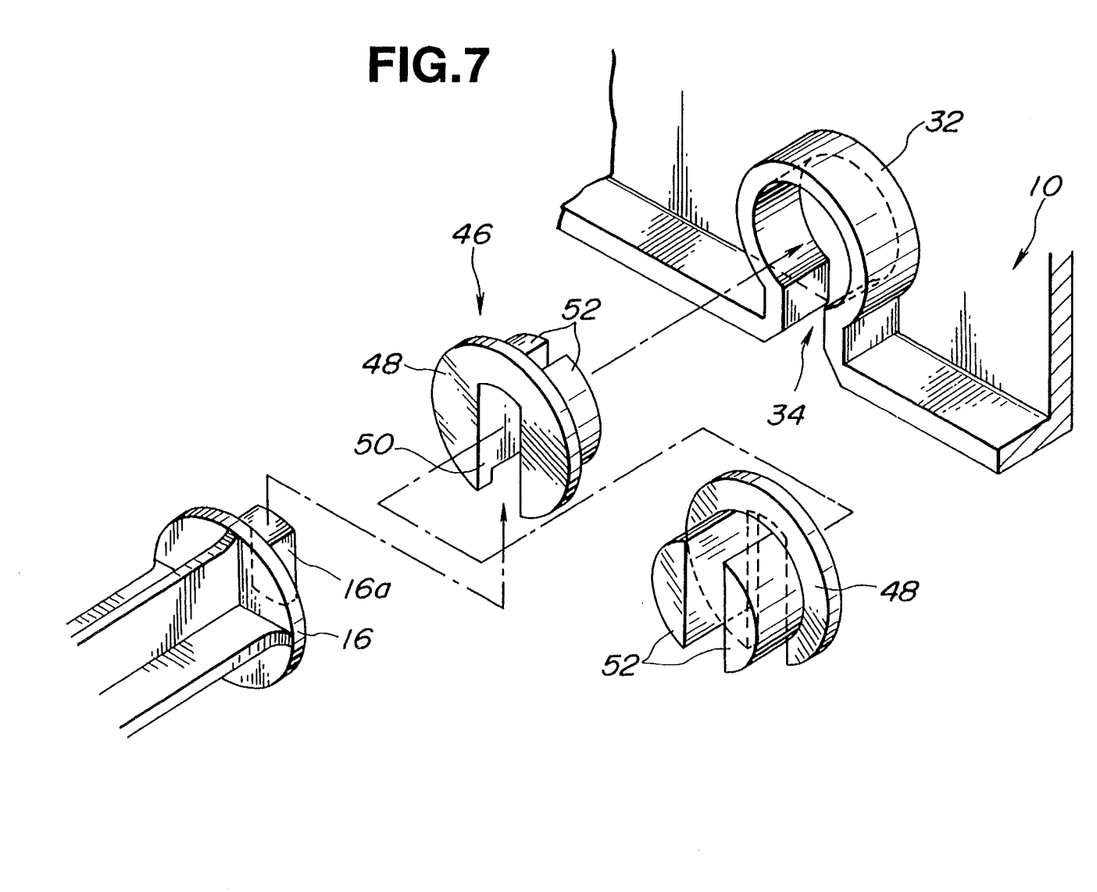
FIG. 7 is an enlarged exploded view of the joining portions of the subassembly of FIG. 1 and the base of the detent mechansim.

As shown in FIG. 7, in order that each pivot section 16a is smoothly rotatable when fitted in each bearing portion 32 whilst being prevented from slipping off through the opening 34, it is preferable to use a bushing 46 disposed between the pivot section 16a and the bearing portion 32. The bushing 46 consists of a flange 48 having a notch 50 within which the pivot section 16a is partly received and a pair of fingers 52 projecting axially from the flange 50 and having a part-cylindrical cross section. The fingers 50 receive therebetween the remaining part of the pivot section 16a and cooperate therewith to define a completely cylindrical unit of a diameter substantially equal to the inner diameter of the bearing portion 32. The flange 48 is disposed outside of the bearing portion 32 whilst the fingers 52 are disposed within the bearing portion 32. The flange 48 has the diameter substantially equal to the outer diameter of the bearing portion 32.

Figure 4:
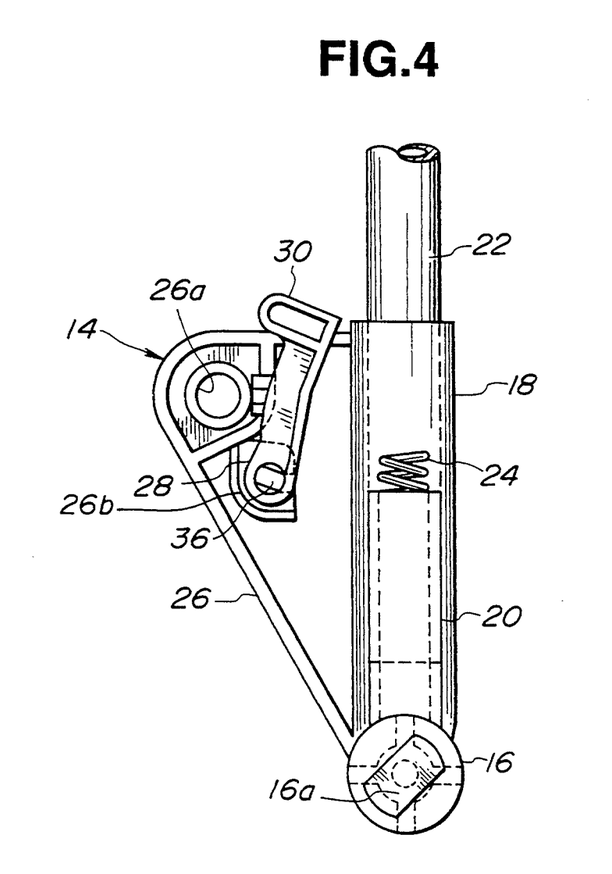
FIG. 4 is a view similar to FIG. 1 but illustrating the constituent parts of the subassembly in an assembled state.

The detent mechanism is assembled as follows. Firstly, the shift lever 22 and the detent arm 28 are installed on the connecting unit 14 to obtain a subassembly as shown in FIG. 4. In order to obtain this subassembly, the shift lever 22, which is not yet provided at the upper end thereof with a knob having a push button, is inserted into the first tubular portion 18 of the connecting unit 14 and fixedly attached thereto, whilst the spring 24 is installed in the second tubular portion 20 to have an upper end portion protruding therefrom. Then, the pivot section 36 of the detent arm 28 is inserted through the opening 38 into the bearing section 26b, whilst holding the detent arm 28 in a nearly vertically upstanding position. Thereafter, the detent arm 28 is inclined a little toward the projected end portion of the spring 22 so as to be held rotatably in the bearing section 26b.

Then, as shown in FIG. 5, the subassembly obtained in the above manner is inserted through the opening 44 formed in the lower end portion of the base 10 whilst allowing the upper end portion of the shift lever 22 to protrude therefrom. Then, as shown in FIG. 7, the bushing 46 is fitted in each bearing portion 32 in such a manner that the notch 50 is aligned with the opening 34. The pivot sections 16a are inserted through the openings 34 into the notches 50 so as to be held rotatably together with the bushings 46 in the bearing portions 32. Then, the shift lever 22 is rotated rightward as shown in FIG. 6. By this, the projection 30 of the detent arm 28 is brought into engagement with the detent teeth 12 whilst at the same time the lower end of the projection 30 is brought into contact with the protruding end portion of the spring 24. Finally, a knob (not shown) is installed on the upper end portion of shift lever 22 to complete the assembling of the automatic transmission shift control device.

From the foregoing, it will be understood that according to the present invention the connecting unit 14, the detent arm 28, the spring 24 and the shift lever 22 are joined together to constitute a subassembly prior to installation of the connecting unit 14 on the base 10 so that when the subassembly is inserted through the opening 44 into the base 10 to attach the pivot sections 16a of the shaft portion 16 to the bearings portions 32 the detent arm 28 is brought into contact with the protruding end portion of the spring 24 for thereby allowing the projection 30 to be automatically brought into engagement with the detent teeth 12, thus making it possible to assemble the detent mechanism with ease and efficiency.

It will be further understood that the projection 30 of the detent arm 28 is always urged by the spring 24 against the detent teeth 12 so that the shift lever 22 can have a sharp operation feel or a click feel since as it turns to shift gears the projection 30 are caused to go over the detent teeth 12.

Figures 8, 11:
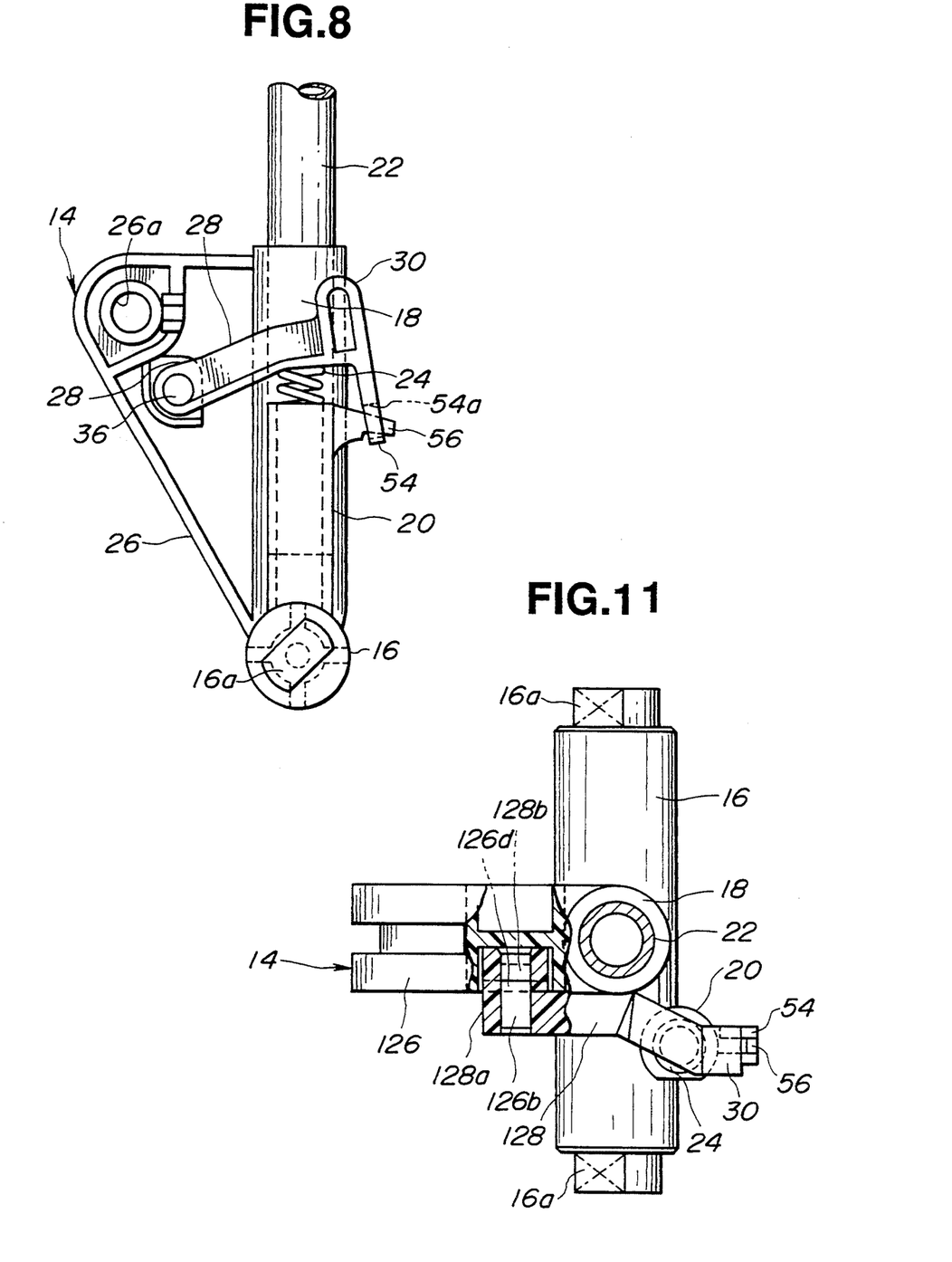
FIG. 8 is a view similar to FIG. 1 but shows another embodiment of the present invention.
FIG. 11 is a top plan view, partly in section, of the embodiment of FIG. 9.

In order to prevent swinging of the detent arm 28 for thereby preventing the same from becoming an obstacle in assembly of the automatic transmission shift control device, the detent arm 28 may be provided, as shown in FIG. 8, at the position opposite to the projection 30 with an integral lever 54 of a predetermined length whilst at the same time the second tubular portion 20 may be provided with a hook 56 for engagement with an opening 54a formed in the lever 54 for thereby preventing swinging of the detent arm 28 during assembly. When the assembly of the automatic transmission shift control device is completed, the lever 54 is resiliently deformed so as to disengage from the hook 56 so that the detent arm 28 becomes freely rotatable.

Figure 9:
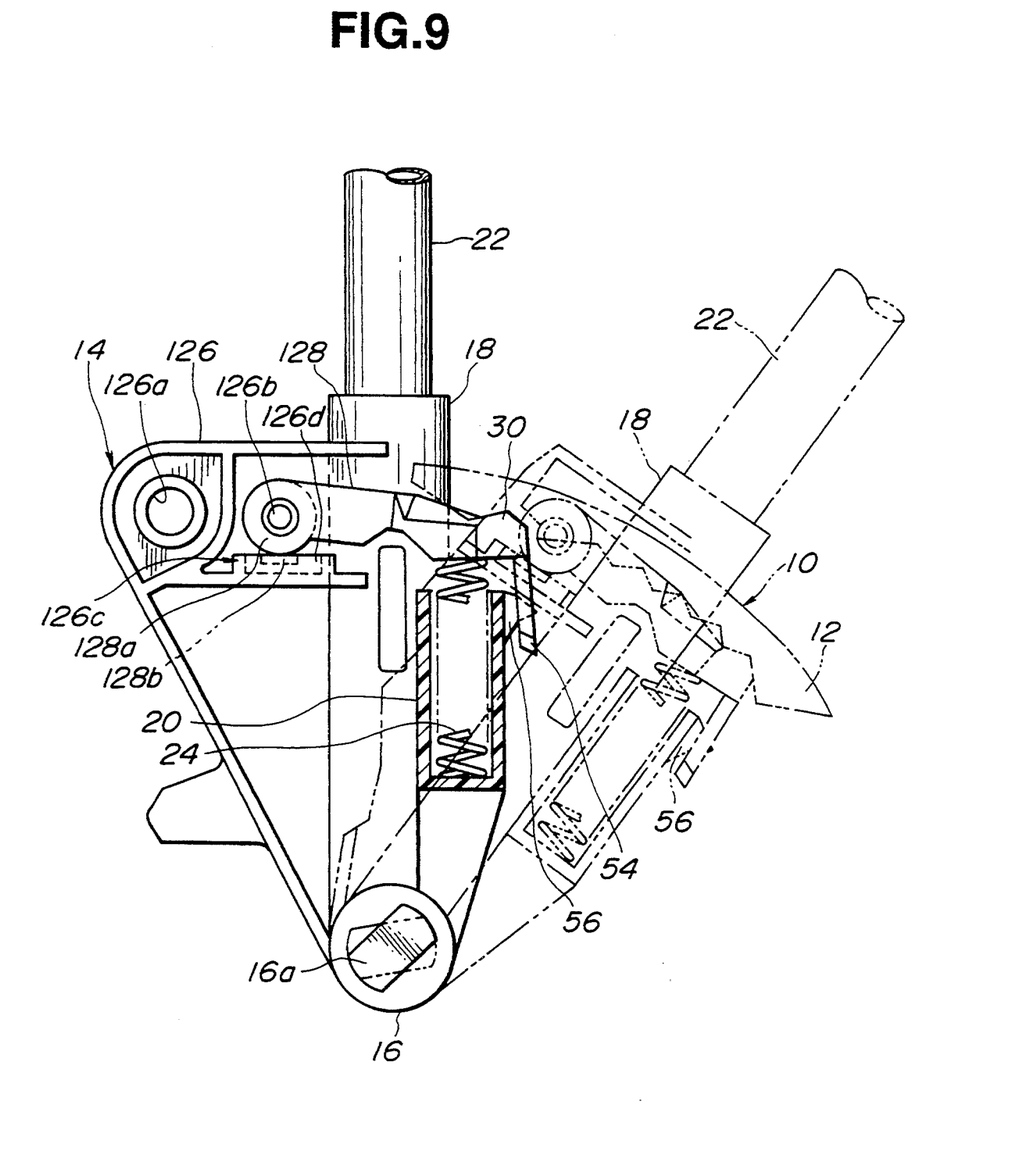
FIG. 9 is a view similar to FIG. 1 but shows a further embodiment of the present invention.
Figure 10:
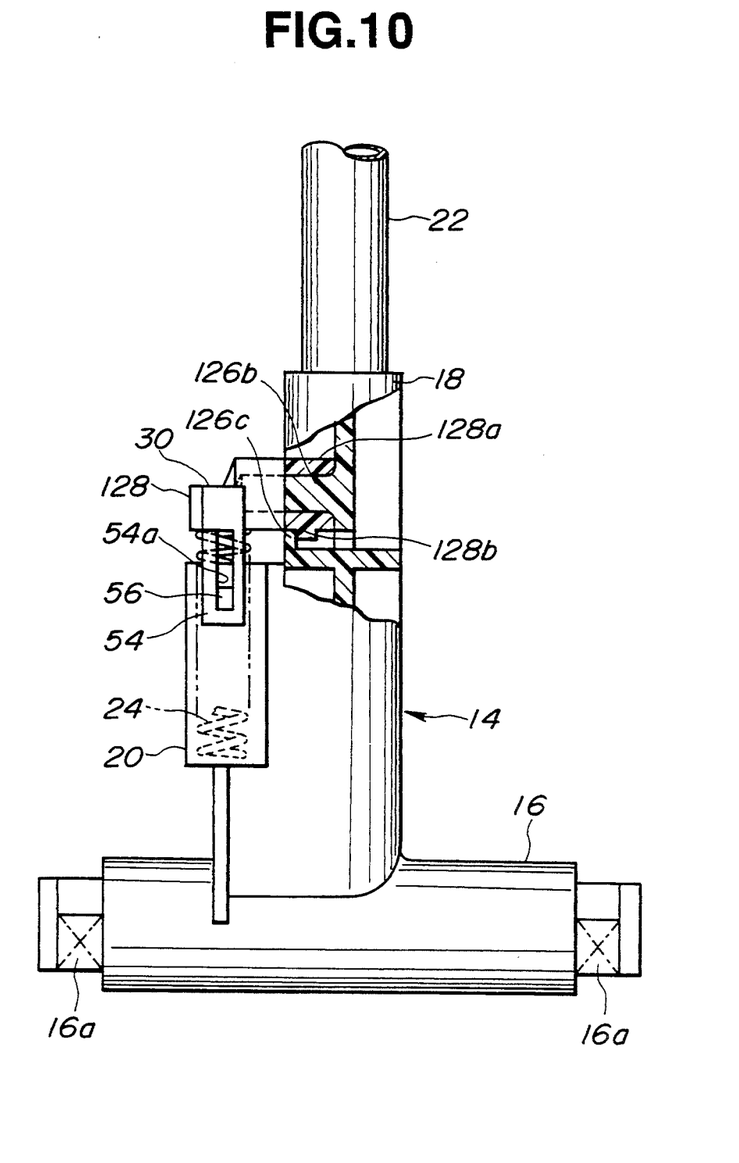
FIG. 10 is a side elevational view of the embodiment of FIG. 9.

Referring to FIGS. 9 to 11, a further embodiment of the present invention will be described. This embodiment mainly differs from the previous embodiments in the detent arm 128 being improved, i.e., the detent arm 128 is adapted to fit on a pivot 126b whilst being bent and elongated at its intermediate portion so as to allow the projection 30 to be located more outside of the base portion 126 not only in the direction of swinging of the detent arm 128 but in the direction perpendicular thereto. Accordingly, the spring 24 for urging the detent arm 128 upward and the second tubular portion 20 for accommodating therein the spring 24 are arranged more outside of the base portion 126 not only in the direction of swinging of the detent arm 128 but in the direction perpendicular thereto, i.e., the second tubular portion 20 is offset from the first tubular portion 18 toward the side opposite to the base portion 26.

More specifically, the base portion 126 is formed with the pivot 126b which is located at the height substantially the same as that of the opening 126a and protrudes laterally outward thereof, a stopper 126c for preventing a hollow cylindrical bearing section 128b of the detent arm 128 from slipping off from the pivot 126b and the second tubular portion 20 displaced away from the first tubular portion 18 in the direction of swinging of the connecting unit 14. The pivot 126b is uniform in diameter throughout the length. The stopper 126c is in the form of a box-like section having an open upper end and disposed right under the pivot section 126b.

On the other hand, the detent arm 128 has at the end provided with the aforementioned hollow cylindrical bearing section 128a an integral projection 128b protruding radially outward from the bearing section 128a. This projection 128b is movably received within the stopper 126c for allowing swinging of the detent arm 128 whilst being abuttingly engageable with a side wall of the stopper for preventing the bearing section 128a from slipping off from the pivot section 126b. The detent arm 128 is bent at its intermediate portion in such a manner that the end portion provided with the projection 30 is positioned right above the second tubular portion 20. The detent arm 128 has at the end provided with the projection 30 a lever 54 similarly to the previous embodiment of FIG. 7. The lever 54 has an opening 54a in which a hook 56 provided to the second tubular portion 18 is engaged.

In installation of the detent arm 128 on the connecting unit 14, the bearing section 128a of the detent arm 128 is fitted on the pivot 126b whilst being held in a position where the projection 30 is not caused to abut upon a front wall 126d of the box-like stopper 126c. Thereafter, the detent arm 128 is rotated in a predetermined direction to allow the opening 54a of the lever 54 to engage the hook 56, whereby the projection 128b is moved into the inside of the box-like stopper 126c.

With this embodiment, the center of rotation of the detent arm 128 can be arranged on or adjacent an arc on which the detent teeth 12 are located, i.e., the distance between the axis of rotation of the detent arm 128 and the axis of rotation of said connecting unit 14 can be equal or nearly equal to the distance between the axis of rotation of the connecting unit 14 and an arc on which the detent teeth 12 are arranged, whereby the projection 30 of the detent arm 128 can be urged uniformly against any of the detent teeth 12 to enable to attain a uniform operation feel of the shift lever 22.

What is claimed is:

1. A detent mechanism for an automatic transmission shift control device, comprising:
   a stationary base having a plurality of detent teeth;
   a single piece pivotal connecting unit pivotally connecting a shift lever to said base and having an upstanding tubular portion and a base portion at side of said tubular portion;
   a spring installed in said tubular portion and having an upper end portion protruding from same; and
   a detent arm pivotally installed at an end on said base portion and engaged at the other end with said protruding end portion of said spring;
   said detent arm having at said other end a projection releasably engaged with one of said detent teeth.

2. A detent mechanism for an automatic transmission shift control device, comprising:
   a stationary base having a plurality of detent teeth;
   a single piece pivotal connecting unit having a horizontal shaft portion which is pivotally installed on said base, first and second upstanding parallel tubular portions connected at lower ends thereof to said shaft portion, and a base portion at a side of said first and second tubular portions;
   said first tubular portion installing therein a shift lever;
   a spring installed in said second tubular portion and having an upper end portion protruding from same; and
   a detent arm pivotally installed at a first longitudinal end on said base portion and engaged at a second longitudinal end with said protruding end portion of said spring;
   said detent arm having at said second longitudinal end a projection releasably engaged with one of said detent teeth.

3. A detent mechanism according to claim 2, wherein said shaft portion has at each of its opposite longitudinal ends thereof a part-cylindrical pivot section having an oblong cross section consisting of two parallel straight sides and two part-circular sides, said base having a pair of part-cylindrical bearing portions having openings through which said pivot sections of said shaft portion are inserted into said bearing portions by aligning said part-circular sides of said pivot sections with said openings and rotatably held therein by misaligning said part-circular sides of said pivot sections with said openings.

4. A detent mechanism according to claim 3, further comprising a pair of bushings disposed between said bearing portions and said pivot sections, respectively, said bushings each consisting of a flange having a notch within which said pivot section is partly received and a pair of fingers projecting axially from said flange and each having a part-circular cross section, said fingers receiving therebetween a remaining part of said pivot section and cooperating therewith to define a completely cylindrical unit, said flange being disposed outside of said bearing portion whilst said fingers being disposed within said bearing portion.

5. A detent mechanism according to claim 2, wherein said detent arm has at said first longitudinal end a part-cylindrical pivot section protruding laterally therefrom, said pivot section having an oblong cross section consisting of two parallel straight sides and two part-circular sides, said base portion having a part-cylindrical bearing section having an opening through which said pivot section is inserted into said bearing section by aligning said part-circular sides of said pivot section with said opening and rotatably held therein by misaligning said part-circular sides of said pivot section with said opening.

6. A detent mechanism according to claim 5, wherein said base portion is located in a vertical plane along which said connecting unit swings.

7. A detent mechanism according to claim 2 wherein said base portion is in the form of a flat, triangular framework and connected to said shaft portion and said first tubular portion.

8. A detent mechanism according to claim 2, wherein said base has at a lower end thereof an opening for allowing an assembly consisting of said connecting unit with the shift lever, said spring and said detent arm to mass therethrough when said assembly is to be installed on said base.

9. A detent mechanism according to claim 2, wherein said detent arm has at said second longitudinal end an integral lever formed with an opening, and said second tubular portion has an integral hook projecting laterally thereof to have an end portion which is lockingly engageable in said opening of said lever for restricting movement of said detent arm relative to said connecting unit prior to installation of an assembly consisting of said connecting unit with the shift lever, said detent arm and said spring on said base, said lever being resiliently deformable so as to be disengaged from said hook for thereby making said detent arm freely movable after installation of said assembly on said base.

10. A detent mechanism according to claim 9, wherein said lever and said hook are located in a vertical plane along which said connecting unit swings, said lever being arranged on the opposite side of said second tubular portion with respect to said base portion.

11. A detent mechanism according to claim 2, wherein the distance between the axis of rotation of said detent arm and the axis of rotation of said connecting unit is equal or nearly equal to the distance between the axis of rotation of said connecting unit and an arc on which said detent teeth are arranged.

12. A detent mechanism according to claim 2, wherein said second tubular portion is offset from said first tubular portion toward the side opposite to said base portion.

13. A detent mechanism according to claim 12, wherein said detent arm is bent at its intermediate portion so that said second longitudinal end can be positioned right above said second tubular portion.

14. A detent mechanism according to claim 2, wherein said base portion has a horizontal pivot section and a box-like stopper section under said pivot section, and said detent arm has at said first longitudinal end a hollow cylindrical bearing section fitted on said pivot section, said detent arm further having at said first longitudinal end a projection which can be placed outside said box-like stopper section when said detent arm is held in an angular position outside of a predetermined range and is moved into said box-like stopper section to prevent slipping off of said bearing section from said pivot section as said detent arm is rotated into an angular position within said predetermined range.

* * * * *